Figure 1:
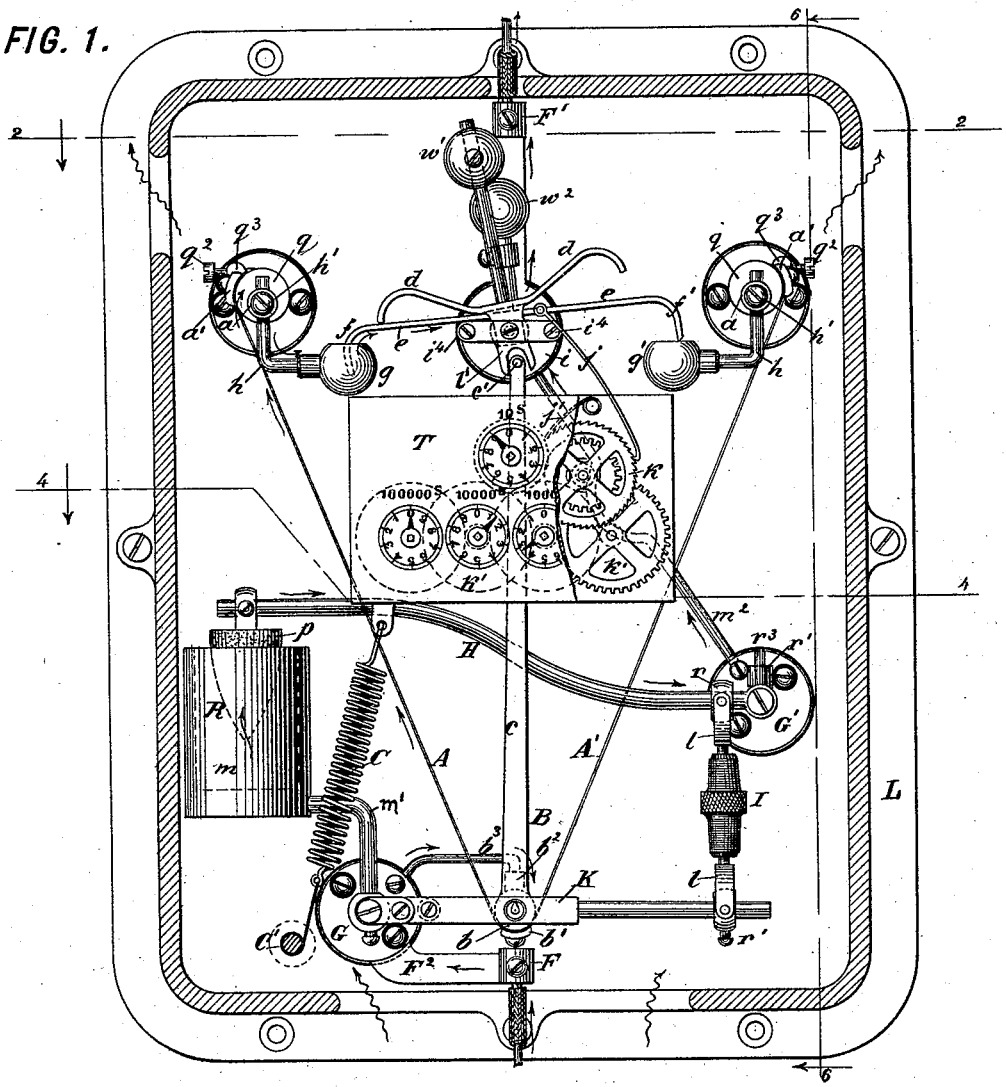

(No Model.)  7 Sheets—Sheet 1.

J. J. WOOD.
ELECTRIC METER.

No. 455,524.  Patented July 7, 1891.

WITNESSES:
John Becker
Fred White

INVENTOR:
James J. Wood,
By his Attorneys,
Arthur C. Fraser & Co.

(No Model.)　　　　　　　　　　　　　　　　　7 Sheets—Sheet 2.
J. J. WOOD.
ELECTRIC METER.

No. 455,524.　　　　　　　　　　　　Patented July 7, 1891.

WITNESSES:　　　　　　　　　　　　　　　INVENTOR:
John Becker　　　　　　　　　　　　　　　James J. Wood,
Fred White　　　　　　　　　　　　　　　By his Attorneys, (No Model.) 7 Sheets—Sheet 3.
J. J. WOOD.
ELECTRIC METER.
No. 455,524. Patented July 7, 1891.
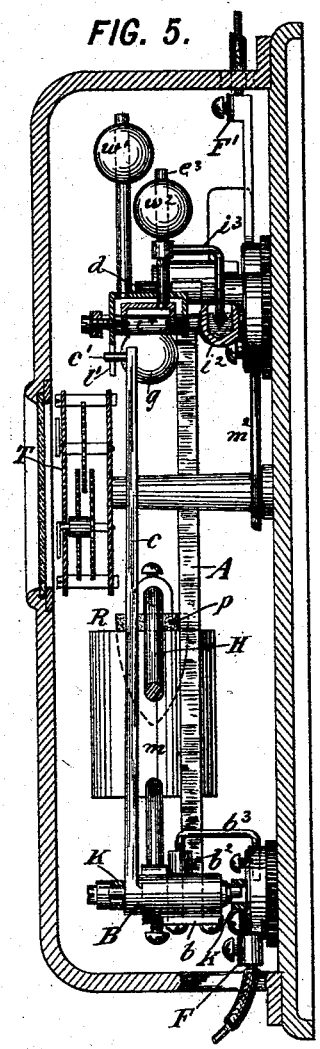
FIG. 5.
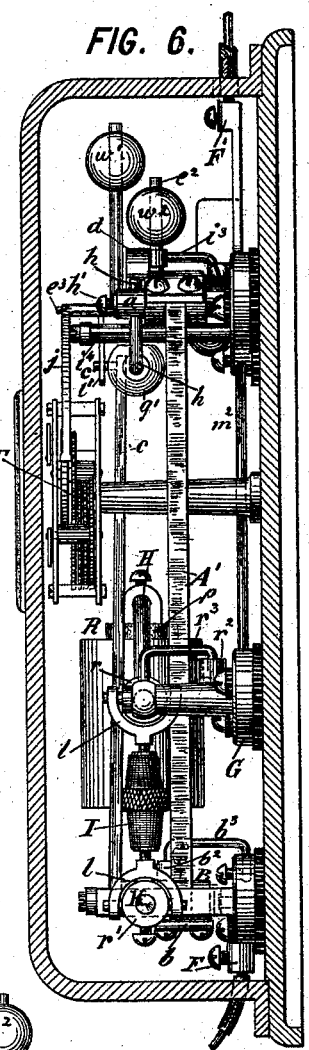
FIG. 6.
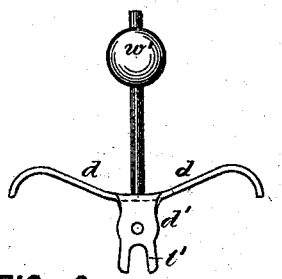
FIG. 7.   FIG. 7.ª
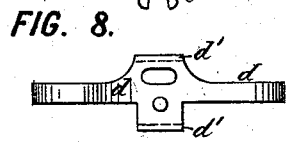
FIG. 8.
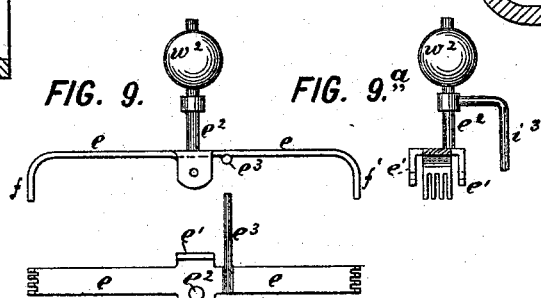
FIG. 9.   FIG. 9.ª
FIG. 10.
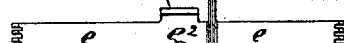
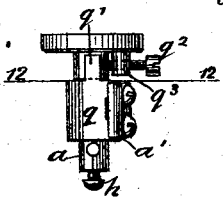
FIG. 11.   FIG. 12.
WITNESSES:
John Becker
Fred White
INVENTOR:
James J. Wood,
By his Attorneys,
Arthur G. Fraser & Co.

(No Model.)  7 Sheets—Sheet 4.

J. J. WOOD.
ELECTRIC METER.

No. 455,524. Patented July 7, 1891.

WITNESSES:
John Becker
Fred White

INVENTOR:
James J. Wood,
By his Attorneys,
Arthur B. Braden & Co.

(No Model.) 7 Sheets—Sheet 5.

J. J. WOOD.
ELECTRIC METER.

No. 455,524. Patented July 7, 1891.

WITNESSES:
John Becker
Fred White

INVENTOR:
James J. Wood,
By his Attorneys, (No Model.) 7 Sheets—Sheet 6.

J. J. WOOD.
ELECTRIC METER.

No. 455,524. Patented July 7, 1891.

WITNESSES:
John Becker
Fred White

INVENTOR:
James J. Wood,
By his Attorneys,
Arthur B. Fraser & Co.

(No Model.) 7 Sheets—Sheet 7.

J. J. WOOD.
ELECTRIC METER.

No. 455,524. Patented July 7, 1891.

WITNESSES:
John Becker
Fred White

INVENTOR:
James J. Wood,
By his Attorneys,
Arthur E. Fraser & Co.

UNITED STATES PATENT OFFICE.

JAMES J. WOOD, OF BROOKLYN, NEW YORK.

ELECTRIC METER.

SPECIFICATION forming part of Letters Patent No. 455,524, dated July 7, 1891.

Application filed October 30, 1890. Serial No. 369,822. (No model.)

*To all whom it may concern:*

Be it known that I, JAMES J. WOOD, a citizen of the United States, residing at Brooklyn, in the county of Kings and State of New York, have invented certain new and useful Improvements in Electric Meters, of which the following is a specification.

This invention relates, in general, to meters for measuring the consumption of electricity, its general objects being to increase the range between the maximum and minimum currents which can be measured and to bring the rate of measurement or indication into more exact proportion to the rate of flow of currents of varying volumes.

My invention is generally applicable to all the various types or classes of electric meters, and more especially to those in which a registering or totalizing apparatus is employed to continuously count up and indicate a progressive total of the electrical units employed—such as watts or ampère hours, for example. Such meters include, among others, first, those consisting of an ammeter or voltmeter with mechanism for adding together the readings thereof at regular intervals of time; second, those operating by the opening of a magnetically-controlled valve governing the flow of a liquid which is automatically measured; third, those in which a resistant-coil heated by the current heats a column of air, the ascending current of which rotates a fan-wheel; fourth, those in which an electrometer working against a variable load is driven by the current and propels a totalizer, and, fifth, those in which the registering mechanism is operated or controlled by a thermal body heated by the current to be measured.

More specifically, my invention relates to thermal meters or those of the class last named. Such meters may be divided generally into two classes—namely, (*a*) those in which a thermal body is heated continuously by the current being measured, so that it varies in expansion proportionally to the variations of the current, and readings are automatically taken from it at successive intervals of time and added together by a totalizing mechanism, and (*b*) those in which two thermal bodies are heated in alternation by the current, the current being diverted from one to the other as often as the differential expansion between the heating and the cooling body reaches a certain extent, and the alternating expansions and contractions being utilized to drive a totalizing mechanism.

My invention is especially designed and adapted to thermal meters of the latter class, as to which it introduces improvements both in the general operation and in details of construction.

In order that the general purpose of my invention may be better understood, I will state that great difficulty has been encountered in the construction of an electric meter which should be suitable for measuring with equal percentage of accuracy both large and small expenditures of electric energy. For example, as applied to electric lighting, it is desirable that a meter should be capable of registering the current passing when only one lamp is lighted as well as the current when the total number of lamps operated by one subscriber is in use—say, for example, a maximum of fifty, one hundred, two hundred, three hundred, or more, as the case may be. Heretofore, with the possible exception of meters operating by electro-deposition from a saline solution, this result has been practically impossible of realization. Thus a meter sensitive enough to register for one lamp could not be made to register a larger current than that for, perhaps, twenty lamps, while a meter capable of registering the consumption of energy when, say, three hundred lamps are burning could not be made to give a reliable indication when as few as perhaps fifty or seventy-five lamps are in use. This difficulty is perhaps attributable, at least in part, to the fact that the electric energy consumed in operating the meter itself is much larger in proportion when a small current is being measured than when a large current is passing. Assuming, for example, the meter were to consume the same energy as one incandescent lamp, its consumption or loss would amount to one hundred per cent. of the utilized current when one lamp is burning, but to only one per cent. when one hundred lamps are in use.

One of the objects of my invention is to render the meter equally sensitive and accurate in measuring both small and large expenditures of energy.

Another difficulty encountered with some meters is that the ratio at which the meter registers is not in direct proportion to the variations in the volume of the current being measured. In other words, assuming the current to be regularly increased in successive equal time intervals, so that if plotted in a diagram it would appear as a straight inclined line, as shown at $x$ in Fig. 18, the meter, if adjusted to register correctly with a minute current, would overregister in continually-increasing proportion as the current was increased, so that if plotted it would appear somewhat like the line $y$ in Fig. 18. Such a meter affords a deceptive indication, except when regulated to correctly register the average current used, in which case it will overregister with a greater and underregister with a less current, the over and under registers approximately neutralizing each other, so that for some commercial purposes the indication is sufficiently accurate. It is one of the objects of my invention to correct this overregistry and reduce the register of the meter to exact proportion to the variations in current. Such a correct proportion and indication is denoted diagrammatically by the line $z$ in Fig. 18. This line $z$ might be coincident with the line $x$; but by proportionally speeding the train of the totalizer up or down the corrected meter-register may be in any definite proportion below or above the actual current.

Figure 18:
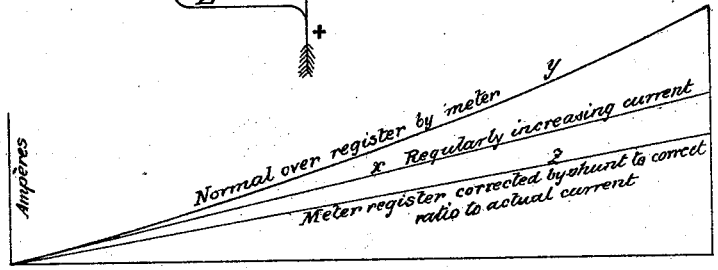
Figure 19:
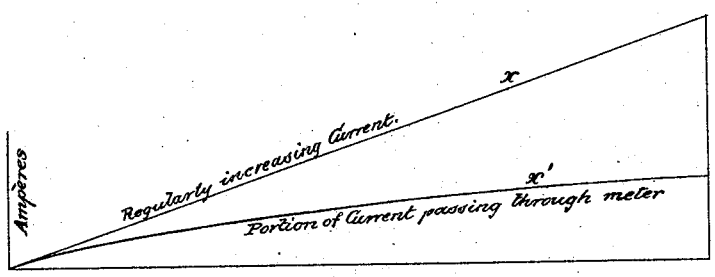

The generic feature of my invention, by means of which the objects above noted are realized, consists in providing a shunt short-circuiting the meter (or, more accurately, the essential current-measuring element thereof) with means for automatically diverting through the shunt a proportion of the total current, which varies as the total current varies, preferably increasing as the volume of current to be measured increases and decreasing as that volume is reduced. The proportion of increase and decrease of the current thus diverted around the meter should be substantially that represented by the overregistry of the meter under different quantums of current; or, graphically speaking, it should correspond to the difference between the lines $x$ and $y$ in Fig. 18. This proportion will ordinarily vary according to some ratio, necessarily ascertained in each case by experiment, and of which only an approximate indication is afforded by the diagram Fig. 18. Fig. 19 illustrates graphically one possible ratio between the total current (denoted by the ascending line $x$) and the portion of the current actually passed through the meter, (denoted by the line $x'$,) the portion diverted through the shunt being that inclosed between the lines $x$ and $x'$. Expressed in percentages, the proportions may be approximately illustrated by the diagram Fig. 20, where $x$ denotes a regularly-increasing current in ampères, and $x''$ is the line dividing the proportion of current passing through the meter shown beneath that line from the proportion diverted through the shunt shown above it. With the minimum current, as shown at the left, one hundred per cent. passes through the meter, and this percentage is gradually lowered as the current increases until, with the maximum current, perhaps thirty-three per cent. or other proportion traverses the meter, the remainder passing through the shunt.

The proportions of current which flow through the meter and through the shunt, respectively, are determined, of course, by the respective resistances of the two paths thus afforded. Thus with the minimum current the resistance of the shunt is relatively infinite, and as the current increases this relative resistance is gradually reduced, according to the particular ratio ascertained to be necessary, until when the current reaches its maximum the resistance of the shunt relatively to the meter reaches its minimum. This result may be accomplished, first, by varying the resistance of the shunt, leaving that of the meter uniform; second, by varying the resistance of the meter, leaving that of the shunt uniform, or, third, by inversely varying both resistances. The first method is preferable. To practice it, I provide in the shunt a variable rheostat operated by or in consequence of variations of current, being normally of a high resistance and acting to reduce its resistance as the current is increased. This rheostat is operated by any suitable electro-motive device, as by one of the elements of the meter or by means extraneous thereto.

In applying my invention to a thermic meter I prefer to operate the rheostat directly by the current-measuring device or element of the meter. To accomplish this I connect the thermal body or bodies, the expansions and contractions of which determine the indication of the meter, to the rheostat through any suitable intermedium in such manner that as the temperature or mean temperature of the thermal body or bodies increases the rheostat is operated to decrease its resistance, and thereby divert a greater proportion of current around the measuring elements of the meter. This has the advantage that the heating of the thermal body or bodies is rendered proportionally less by a large than by a small current, and the rheostat may be so proportioned that in case of an excessive current, which of itself would be liable to burn out or injure the thermal device, so great a proportion thereof will be diverted through the shunt that the remaining current will be so reduced in volume as to be harmless in its effect.

The thermic meter, to which the specific features of my invention pertain, comprises two thermo-expansible bodies arranged to be heated by the passage of an electric current, preferably being made as conductors of suitable resistance, through which the current is directly passed. The electric circuit is divided into two branches, each of which includes one of the thermal bodies, (or a separate resistance arranged to impart heat to such body,) and the current is directed through the branches in alternation by means of a switch, which is operated by the differential expanding and contracting movements of the thermal bodies, so that the heating of one body by the current and the cooling of the other body by radiation progresses until a certain difference in their dimensions is established, whereupon the switch is thrown. The thermal bodies are independently connected to short arms of a lever, which they oscillate, and which in turn operates the switch. The thermal bodies are preferably in the form of strips or wires and are stretched by a tension device, such as a spring or weight. With a small current the switch moves at infrequent intervals, and as the current increases the movements of the switch become more rapid. The movements of the switch are communicated to the totalizer, which thus counts the total number of switching movements. The rapidity of these movements does not vary in a uniform ratio with the variations of current.

My present invention provides for diverting more or less of the current through the shunt in such proportion as may be necessary to bring the rapidity of switching movements into exact ratio with the variations of current. To this end the rheostat governing the shunt is operated by the mean elongation of the thermal bodies. These bodies are heated to a higher mean temperature by a large than by a small current, owing not only to the greater heating power of the larger current, but also to the shorter intervals for cooling during the intermissions of the current. Consequently when the switch is being rapidly alternated the thermal devices maintain a greater mean or average elongation than during the passage of a small current, when the switch is alternated at comparatively infrequent intervals.

Having thus indicated the generic and to some extent the specific features and applications of my invention, I will now proceed to describe its preferred embodiment with reference to the accompanying drawings and with such minuteness as will enable those skilled in the art to apply my invention, and I will then describe certain modifications and other or different applications of my invention.

Figure 2:
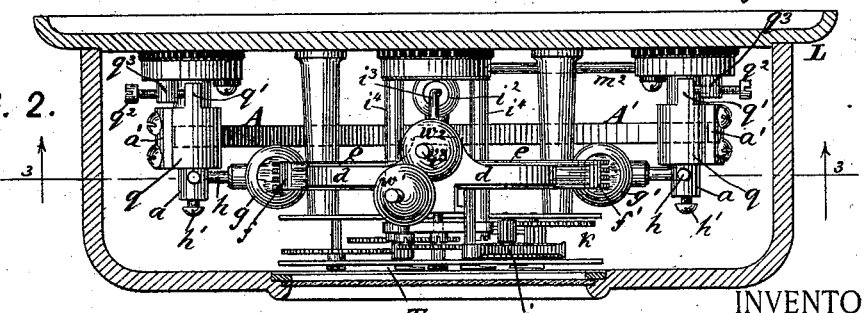
Figure 3:
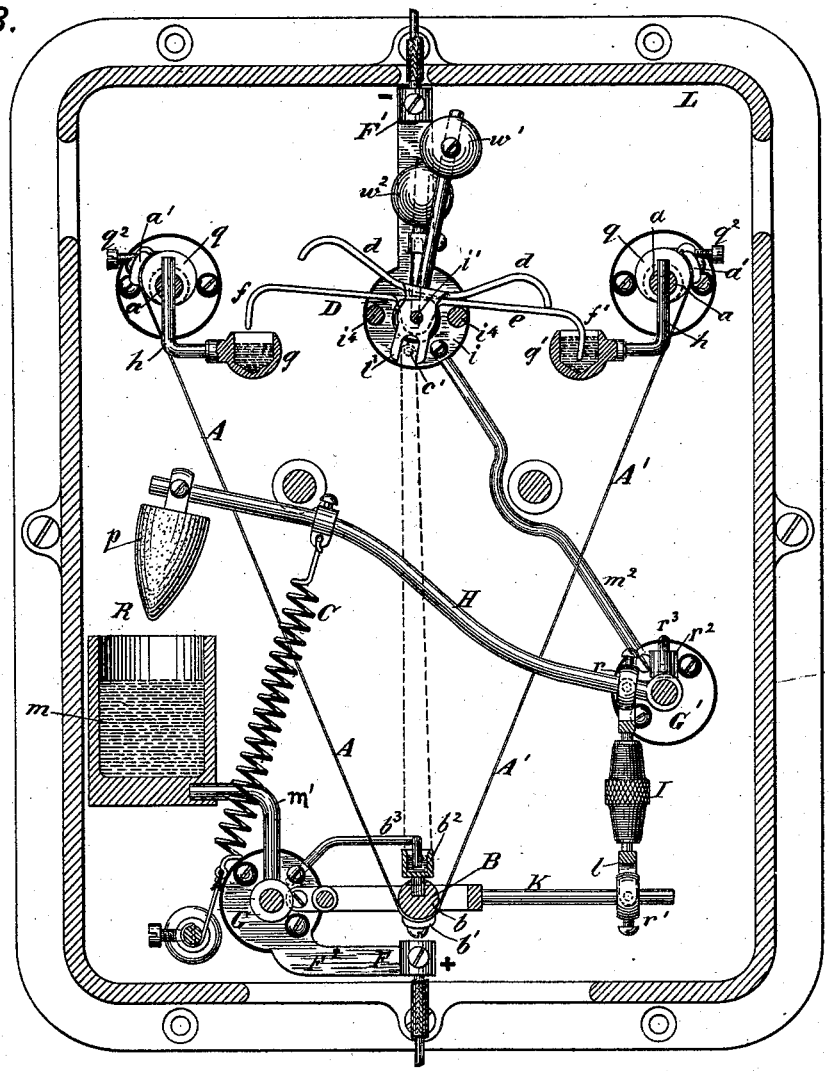
Figure 4:
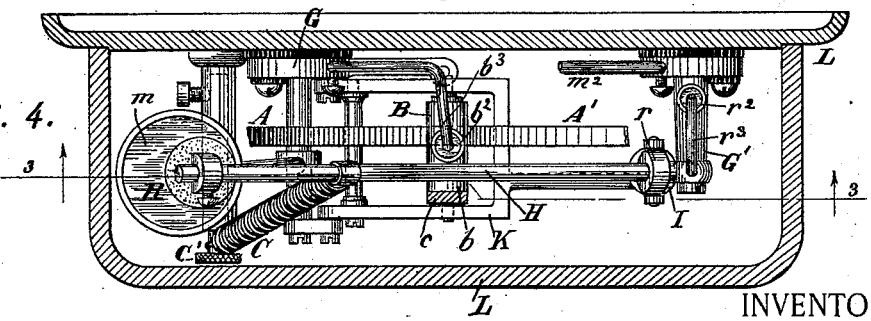
Figure 13:
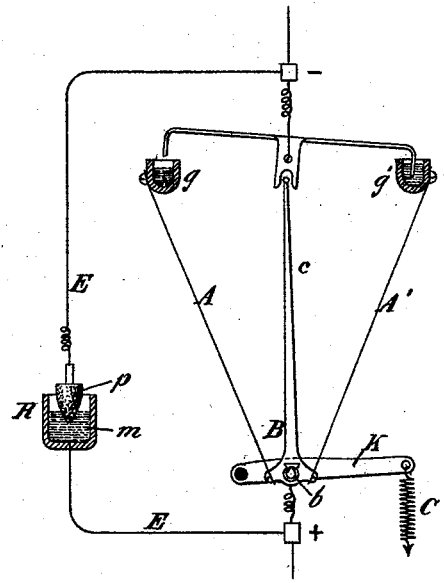
Figure 14:
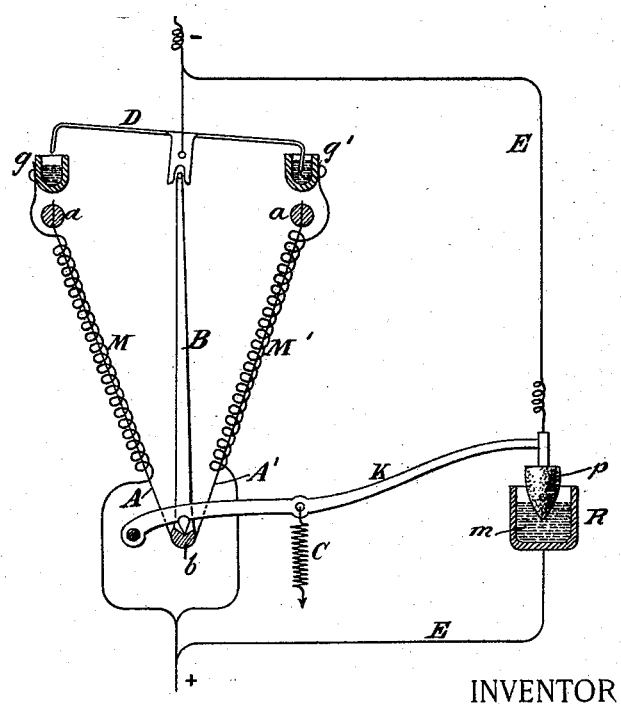
Figure 15:
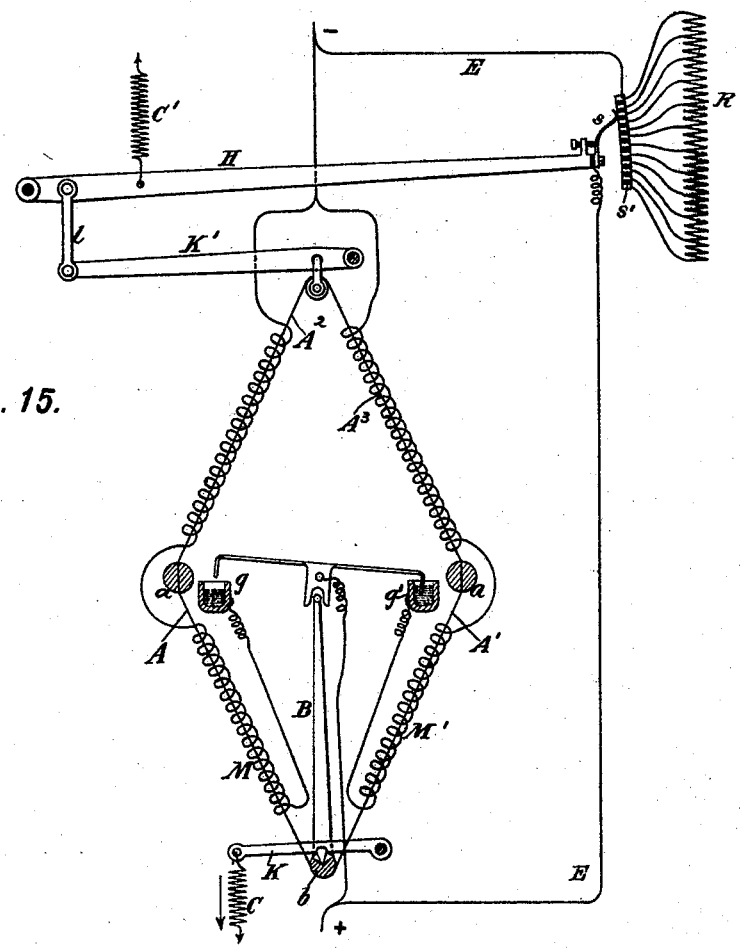
Figure 16:
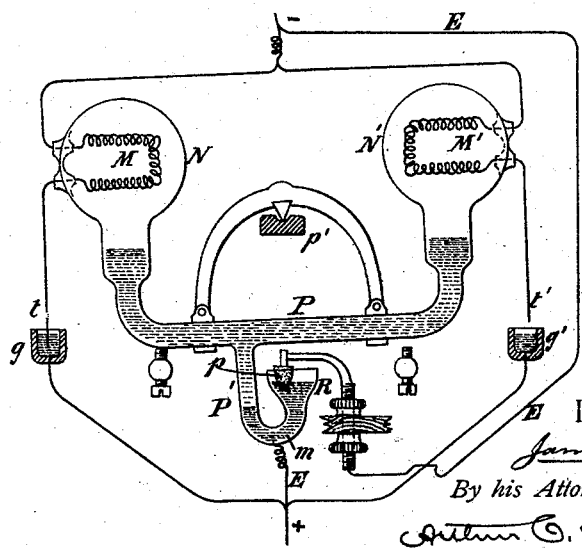
Figure 17:
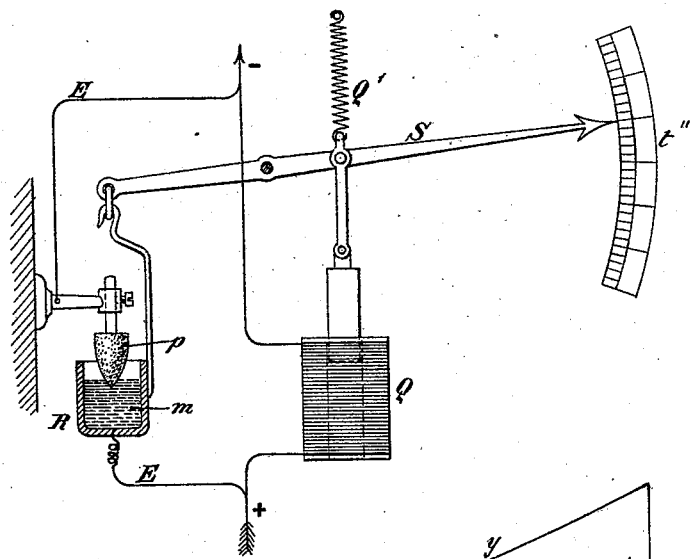
Figure 20:
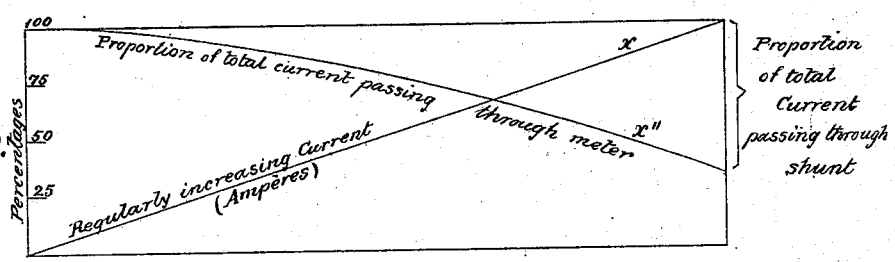
Figure 21:
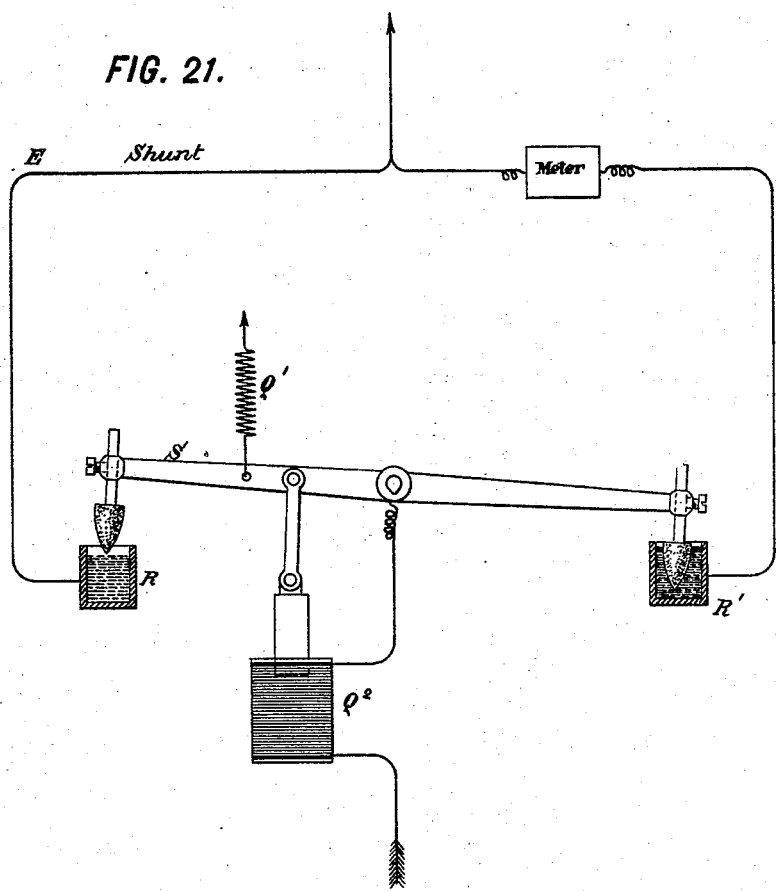

Figures 1 to 12 of the accompanying drawings illustrate in detail an electric meter and its accessories embodying my complete invention. The remaining views are diagrams and views illustrating modifications. Fig. 1 is a front elevation of my improved meter with its inclosing case cut away in vertical section. Fig. 2 is a plan of the meter, the inclosing case being in horizontal section in the plane of the line 2 2 in Fig. 1. Fig. 3 is a front elevation of the meter, partly in vertical section, in the planes indicated approximately by the lines 3 3 in Figs. 2 and 4. Fig. 4 is a horizontal section in approximately the planes denoted by the line 4 4 in Fig. 1. Fig. 5 is a vertical transverse mid-section. Fig. 6 is a side elevation, the inclosing case being in vertical section in the plane of the line 6 6 in Fig. 1. Figs. 7 and 9 are front elevations, Figs. 7$^a$ and 9$^a$ sectional side elevations, and Figs. 8 and 10 plan views, of parts of the electric switch detached. Fig. 11 is a plan of the tension-adjusting device for one of the thermal bodies or strips, and Fig. 12 is a vertical section thereof in the plane of the line 12 12 in Fig. 11. Fig. 13 is a diagrammatic front elevation showing the electrical features and showing mechanical elements of the meter in elemental simplification. Fig. 14 is a partial diagrammatic front elevation, partly in section, showing a modified embodiment of my invention. Fig. 15 is a similar view showing a further modification. Figs. 16 and 17 are similar views showing two further modifications. Figs. 18, 19, and 20 are diagrams which have been already explained. Fig. 21 is an elevation illustrating a further modification embodying the generic principle of my invention.

The instrument shown in Figs. 1 to 6 is of the same general character as that embodied in a previous application of mine, filed November 3, 1888, Serial No. 289,857. My present construction embodies some improvements upon the construction shown in that application. Referring to these figures, A and A' are two metal strips of suitable electric resistance, fastened at their upper ends to unyielding supports $a$ $a$ and at their lower ends to a boss $b$, constituting two short arms of a lever B, the long arm $c$ of which projects, preferably, upwardly, in order to operate an electric switch D. In practice I make the metal strips of very thin metal, so as to afford a sufficiently high resistance to the passage through them of an electric current; but suitably fine wires may be substituted. The tension device is arranged to act against the lever B in order to stretch the strips A A'. In the construction shown the lever B is pivoted through the medium of knife-edges to a lever K, the long arm of which is connected through a link $l$ to a secondary lever H adjacent to the fulcrum thereof, while the long arm of this lever is connected to a spring C, constituting the tension device referred to, and the tension of which is communicated through the compound levers to the lever B of the strips. The tension-spring C should be adjustable by means of an adjusting-screw or other device C'. The electric circuit traversing the instrument is divided into two branches, one of which includes the strip A and the other the strip A'. The current is sent through these branches alternately by the switch D. This switch may be of any construction known in the art for directing a current alternately through two branches. The construction shown consists of a rocking lever $e$, the arms of which extend to opposite sides of its fulcrum and terminate in fingers $f f'$, which turn downwardly and are arranged to dip alternately into mercury-cups $g$ and $g'$, respectively. The rocking of the lever $e$ is effected by an independently-movable lever $d$, having lateral projecting arms extending over the lever $e$, and a central counter-weight $w'$, mounted on an arm projecting upwardly from the lever $d$. The lever $d$ has a forked arm $l'$ projecting beneath its fulcrum and engaging a pin $c'$ on the end of the arm $c$, by which the switch is turned. The mercury-cup $g$ is in electric connection through its supporting-rod $h$ with the fixed post $a$, to which the strip A is fastened, while the cup $g'$ is similarly connected through its rod $h$ with the post $a$ of the other strip A'. The lower ends of the strips are connected through the conducting-lever B with the main or undivided portion of the circuit leading to the binding-post F, while the switch-lever $e$ is electrically connected through its fulcrum-support $i$ with the other binding-post F'. The current entering by either binding-post passes through one of the strips A or A' and out by the other binding-post. Because of the resistance of the strip it heats the latter and expands it. As the other strip remains unheated, this expansion causes an oscillation of the boss $b$ and vibrates the lever-arm $c$. When this vibration becomes sufficient in extent, the pin $c'$ engages the fork $l'$ and throws over the lever $d$, which, as its weight $w'$ passes the center, drops to the opposite side, and in so doing strikes the lever $e$ and tilts it to its opposite position, thereby breaking the circuit through the heated strip and establishing it through the unheated one. The heated strip immediately proceeds to cool by radiation, and the other strip through which the current is passing is heated. The respective contracting and expanding movements oscillate the boss $b$ in the opposite direction and vibrate the arm $c$, which in turn operates the switch again to reverse the current. The switch is thus thrown whenever the differential elongating and contracting movements of the strips become sufficient to effect the requisite vibration of the arm $c$ of the lever B. The rocking of the switch occurs with a frequency that is approximately proportional to the quantity of current passing through the meter. These rocking movements are counted or registered by a totalizing mechanism T, (shown in Figs. 1 and 2,) which may be driven either from the lever B or from the switch. I have shown it driven by a pawl $j$, pivoted to the lever $e$ and engaging the ratchet-wheel $k$, which has a stop-pawl $j'$. This ratchet-wheel communicates motion through a train of gears $k'$ $k'$ to a series of hands or pointers working over dials after the manner of the registering mechanism commonly used in gas-meters and other devices of similar order.

So far as described this construction of meter does not differ radically from that disclosed in my said previous application. Such a meter, if adjusted to register correctly for a low expenditure of energy, tends to over-register as the consumption increases. This result may be due to the fact that as the switch movements become more rapid the periods during which the strips A A' are cooling become shorter, while the strips are more highly heated by the increased current, so that during this restricted time the strips are unable to cool to the same extent as with a small current, which gives rise to more frequent switching movements.

The application of my present invention to a meter of this character may be best understood from an examination of the diagram Fig. 13, where the course of the current through the strips A or A' and switch D is clearly indicated. My invention provides a shunt E around these elements of the meter—that is to say, essentially around the meter itself—and in this shunt is provided a variable rheostat R. This rheostat is so operated that with a minimum current it offers the maximum resistance and with the maximum current the minimum resistance, so that with a minimum current practically the entire current is caused to pass through the meter, while with a maximum current the maximum proportion of the current is diverted through the shunt somewhat in the manner indicated in the diagram Fig. 20. Numerous constructions of rheostat are known in the art which may be used for this purpose; but that which I prefer by reason of its simplicity consists of a mercury bath $m$, into which a tapering plunger $p$, preferably of carbon, is immersed to greater or less extent. When this plunger is lifted out of the bath, the resistance of the rheostat becomes infinite. When the tip of the plunger is immersed in the mercury, the resistance is still very high, and as the plunger is lowered, and consequently a greater portion of its surface is immersed, the resistance becomes continually lower. In practice I prefer to operate this plunger by mounting it on the long arm of the secondary lever H, as shown in Figs. 1 to 6. When there is no current through the meter, and the strips are consequently cold and contracted, the plunger is or may be lifted entirely out of the mercury bath, as shown in Fig. 3. With a small current there may be sufficient elongation of the strips to enable the spring C to draw the plunger down until its tip barely touches the mercury. As the current increases and the strips A A' are further elongated, the plunger is drawn still lower into the mercury, while with the maximum current the maximum elongation of the strips enables the spring C to draw the plunger down to its greatest immersion in the mercury. When thus fully immersed, the plunger $p$ and mercury $m$, constituting the rheostat R, afford a resistance of a certain proportion to that of the meter proper—say, for example, one-half, or one-third, or two-thirds, or other proportion, as may be found to be necessary. If, for example, with the maximum current the meter overregisters fifty per cent., as denoted in Fig. 18, the minimum resistance of the rheostat should afford through the shunt a conductivity fifty per cent. of that of the meter proper, in order that the proportion of current representing the overregistration shall be deflected around the meter and thereby reduce its registration to exact proportion to the actual current. The shape of the plunger $p$ should be such that in all intermediate positions between initial and complete immersion it shall afford a conductivity proportional to the overregistry tending to occur with each quantum of current. This must be determined in each instance by experiment. I have found that with the type of meter here shown a conoid of proper dimensions gives approximately correct results. Its length is determined by the extent of its plunging movement plus the ascent of the mercury-level by displacement, while its greatest diameter should be such as to afford a total surface in contact with the mercury at greatest immersion, which will afford the requisite maximum conductivity. Carbon is the preferable material for the plunger, but any conducting substance may be used instead; but it should be such substance as will not be chemically acted upon by the mercury. Any other liquid than mercury might be used by adopting suitable means to avoid change of its volume by evaporation or other causes.

In the meter shown in Figs. 1 to 6 the current in the shunt E passes from the binding-post F through the standard G, to which the lever K is fulcrumed, thence through arm $m'$, the rheostat R, and from the plunger $p$ to the lever H, through this to the standard $G'$, on which it is fulcrumed, and thence through a wire $m^2$ to the standard $i$ of the switch D, from which standard it passes to the binding-post $F'$. The shunt-current thus short circuits the essential or current-measuring elements of the meter proper. The lever H is insulated from the lever K by the interposition in the link $l$ of an insulating-sleeve I.

It will be understood that the elongations and contractions of the strips A A', which operate the rheostat R, are substantially their mean elongations, or at each instant one-half their total elongations. For example, when metering a small current the highest temperature of each of the strips as the current is switched from it may be lower than the lowest temperature as the current is switched to it when metering a large current. This mean elongation does not affect the oscillations of the lever B, which operates the switch and totalizer, as these oscillations are determined by the differential elongations of the two strips. Thus the differential elongations or contractions produce more or less rapid to-and-fro movements of the lever B, while the mean elongations and contractions of the two strips produce very gradual movements of the levers K and H, operating the rheostat, these movements following closely any change in volume of the current.

I will now describe the features of the construction shown in Figs. 1 to 12, which constitute improvements upon the construction shown in my said previous application. The switch D, instead of consisting of a single lever, as formerly, is constructed with two levers $e$ and $d$, as already described, the former constituting, essentially, the switch-lever or portion which acts as the conductor of current, and the latter, which is actuated by the arm $c$, serving in turn to actuate the lever $e$. The lever $d$ need not be of conducting material in order to form any part of the circuit. The lever $e$ is shown detached in Figs. 9 and 10. It is constructed of a piece of sheet or plate metal bent to the form shown and having ears $e'$ on its front and rear sides, which are turned down and perforated for engagement with the pivotal pin $i'$, as shown in Fig. 5. An arm or rod $e^2$ is fixed to the lever and projects vertically, carrying a weight $w^2$, the function of which is to cause the lever $e$ when tilted to either side to remain so against the flotative tendency of the mercury acting to buoy up the end $f$ or $f'$ which is immersed. An arm $e^3$ projects forwardly from the lever $e$, to which arm the pawl $j$ is pivoted. In order to effect a good electrical connection between the lever $e$ and the standard $i$, the latter is provided with a mercury-cup $i^2$, into which dips the end of the wire or rod $i^3$, which projects rearwardly and downwardly from the stem $e^2$, as shown in Fig. 9$^a$. The lever $d$ is made, preferably, from sheet or plate metal, as shown in Figs. 7 and 8, and is bent down at $d'$ at front and rear to form pivotal ears, which are perforated for engagement with the pin $i'$. These ears pass directly outside of the ears $e'$ and work between stops or shoulders on the standard $i$ at front and rear, as shown in Fig. 5, whereby the relative displacement of the parts is prevented. The front ear $d'$ is prolonged downwardly to form the fork $l$, the space between the arms of which is sufficiently wider than the pin $c'$, so that when tilted to either side it will not be engaged thereby until the pin $c'$ in its movement toward the opposite side passes beyond the middle. The arms of the lever $d$ terminate sufficiently above the lever $e$, so that in the rocking of the lever $d$ it must pass the middle and be already falling over at the other side before its arm shall strike the uplifted arm of the lever $e$, in order that the tilting of the latter by the lever $d$ shall be instantaneous, occurring only during the falling movement of the lever $d$. The movement of the lever $e$ is limited by stops $i^4$, Fig. 3, which may constitute parts of the standard $i$, and the lever $e$ in turn forms a stop for the lever $d$. The adjustment of the dip of the fingers $f f'$ in the mercury-cups $g g'$ is effected by the vertical adjustment of these cups, which are carried by the rods $h$, which are adjustable vertically through holes in the standards $a\ a$, being fastened in these holes by set-screws $h'$. The attachment of the lower ends of the strips $A\ A'$ to the boss $b$ of the oscillatory lever B is preferably effected by forming the two strips integrally—that is to say, by using one continuous strip of metal to form them and bending this strip around the boss $b$ and clamping it thereto by a plate $b'$, screwed to the boss. This forms a good mechanical and electrical connection. To form a good electrical connection between the lever B and the binding-post F I provide the lever with a mercury-cup $b^2$, into which dips the end of a wire or rod $b^3$, the opposite end of which is fixed to the standard G, as shown in Figs. 3 and 5. The standard G is in connection with the binding-post F through a metal strip or plate $F^2$. The upper ends of the strips $A\ A'$ are fastened adjustably to the standards $a\ a'$, preferably by means of the construction best shown in Figs. 11 and 12. The fixed portion of the standard $a$ is formed with a cylindrical stud projecting perpendicularly from the back plate, and on this stud is mounted a cylindrical boss $q$, formed with a rearward projection $q'$, which is engaged by an adjusting-screw $q^2$, working in a stationary boss $q^3$. The thermal strip A or $A'$ is fastened to one side of the boss $q$ by a clamping-plate $a'$ screwed thereto, so as to afford a good mechanical and electrical connection. To tighten or increase the tension of the thermal strip, the screw $q^2$ is turned to exert a thrust against the projection $q'$, and thereby slightly oscillate the boss $q$. Other mechanical constructions might be applied for effecting the adjustment of the fixed ends of the thermal strips in order to adjust their relative tension; but the construction shown is preferred because of its simplicity and ease of manufacture and of manipulation. The adjustment of the rheostat R, in order to bring the plunger $p$ into proper relation with the mercury-bath $m$, is effected by means of the insulating-sleeve I, the ends of which engage right and left threads on the terminal portions of the link $l$, so that by turning the sleeve the link may be lengthened or contracted to adjust the plunger $p$ up or down. The adjustment of the throw of the plunger $p$ proportionally to the expansion and contraction of the strips $A\ A'$ is effected by changing the proportions or leverage of the compound lever system $K\ l\ H$. To effect this the pivotal ends of the link $l$ engage set-collars $r$ and $r'$, which are fastened by set-screws on the levers H and K, respectively, so that they may be adjusted to different distances from the fulcra of these levers. To insure a good electrical connection between the pivotal end of the lever H and the standard $G'$, on which it is mounted, a mercury-cup $r^2$, Fig. 6, is fixed on the standard, and the downturned end of a wire $r^3$, fixed to the lever H, enters this cup, Fig. 6. By means of the adjustments thus described the meter may be regulated to adapt it to almost any service by suitably proportioning the resistances of the strips $A\ A'$ and by using a plunger of the proper shape, as must be determined by experiment.

For the protection of the delicate parts of the instrument it is preferable to inclose the meter in a casing such as that shown in the drawings at L. This casing should have an opening in the bottom for the admission of a current of air to cool the thermal strips and should have openings at or near the top for the escape of this air.

My improved meter has the advantage in common with other thermal meters of being applicable for measuring alternating currents equally well with continuous currents.

It must not be inferred from the minuteness of details with which I have described the preferred construction embodying my invention that I am by any means limited to the details of this construction. I will now proceed to describe some modifications of which my invention is susceptible.

It is not essential that the thermal strips $A\ A'$ or other thermal bodies shall be heated directly by the passage of an electric current through them, as they might be heated indirectly by the passage of the current through any suitable resistances, which in turn might communicate the heat to them by radiation or conduction. Fig. 14 illustrates a possible construction realizing this condition. The thermal strips $A\ A'$ are not themselves included in the electric circuit, but are heated by resistance-coils $M\ M'$, which are introduced in the respective branches of the circuit, being connected at one end with the mercury-cups $g\ g'$ of the switch D and being joined together in the circuit at their other ends. The circuit in passing through one of these resistance-coils heats it, and the coil in turn heats the thermal strip. The differential expansions and contractions of the strips operate the oscillatory lever B, and their mean expansions and contractions operate the lever K, which receives the tension of the spring C, and which carries the plunger $g$ of the rheostat R, which is introduced in the shunt E.

It is not essential that the rheostat R shall be operated by the same current-measuring instrumentalities or elements of the meter as those which operate the registering mechanism thereof.

Fig. 15 illustrates an example of the operation of the rheostat by separate means. The thermal strips $A\ A'$ are heated by resistance-coils $M\ M'$, as in Fig. 14, and operate the oscillating lever B of the meter in the same manner, being kept extended by the tension of the spring C being communicated through the lever K. The strips $A\ A'$, however, are continued upwardly above their fastening-standards $a\ a$, these upward extensions (lettered $A^2\ A^3$) being connected to a lever $K'$, which receives the tension of a spring $C'$, and the vibrations of which are communicated through the link $l$ and secondary lever H to the rheostat R. The strips $A^2\ A^3$ being heated by the same resistance-coils as the strips A A' are expanded in the same proportions, and consequently impart the same movements through the levers K' and H to the rheostat as would be imparted from the strips A A'. Any other means for vibrating the levers K' and H (or other intermediates communicating motion to the rheostat) proportionally to the variations in current may be substituted for the strips $A^2 A^3$ in this figure.

As an example of one of the many different types of rheostat that may be used with my invention, I have illustrated in Fig. 15 a rheostat of an ordinary type wherein serially connected resistance-coils are shunted successively in or out of circuit by the contact of a sliding spring $s$ with the contact-plates $s'$, connected between the successive coils.

My invention, as applied to thermal meters, is not limited to the use of solid bodies as the thermal expanding or contracting bodies. The thermal bodies may be liquids, or even gases.

Fig. 16 illustrates a well-known type of meter operated by the expansion and contraction of gases. It consists of two bulbs N N', containing air or other gas, with resistance-coils M M' therein for the purpose of heating the inclosed gas, the bulbs being connected together through the medium of a depending tube P, containing a column of liquid. The heating of the air in one bulb displaces the liquid somewhat into the other bulb and it causes the device to rock on its pivot $p'$. This rocking movement switches the current by moving terminal wires $t$ $t'$ into and out of their respective mercury-cups $g$ $g'$. In order to apply my invention to a meter of this construction, the tube P will be formed with a downward extension P', which is bent and opens upwardly and contains a seal of mercury $m$, in which is partly immersed a stationary plunger $p$. As the current increases and the confined gases are more expanded the mercury-column is displaced, its level rising in the outer leg of the tube P' and immersing more of the plunger $p$, thereby increasing the portion of the current diverted around the meter through the shunt E. This is suggested as a possible application of my invention. My invention, however, is not limited in its application to thermal meters or those operating by the expansion and contraction of bodies according to the variations in the current. It is applicable to all meters wherein there is any moving part which moves proportionally to changes in the current and which may be utilized to actuate the rheostat. Fig. 17 illustrates its application to a meter of the class wherein a solenoid or other electro-magnet or electro-motive device is employed, from which readings may be taken mechanically at intervals and successively added together by the totalizer. The mechanism for taking these readings and adding them is not shown, being well understood in the art. The figure shows a solenoid Q, through which the current to be measured is passed and which attracts its core against the tension of a retracting-spring Q', thus vibrating more or less a lever S, which may be utilized as a current-indicator or ammeter by causing its end to travel as an index over a graduated plate $t''$. This lever operates the rheostat R in the shunt E. In this instance the mercury-cup $m$ is hung from the lever and the plunger $p$ is stationary. As the current increases and the solenoid draws its core lower the lever lifts the mercury-cup, so that a greater surface of the plunger is immersed and a larger proportion of the current is diverted around the solenoid through the shunt.

The means for controlling the proportion of current passing through the shunt may be entirely independent of the meter proper. It may, for example, be a solenoid or other electro-motive device independent of the current-measuring elements of the meter, which is acted upon by the entire current passing and which in turn operates the rheostat to shunt a greater or less proportion of the total current around the meter. Such an arrangement is shown in Fig. 21, wherein a solenoid $Q^2$ receives the entire current passing through the circuit and acts to vibrate a lever S, which operates the rheostat R in the shunt E.

As already stated, the current may be controlled either by varying the resistance in the meter-circuit or by varying the resistance in the shunt-circuit, or by both. Fig. 21 shows a means for operating it by varying both resistances. The circuit is divided into two branches, one of which constitutes the shunt E and the other contains the meter. In the shunt branch is included the rheostat R and in the meter branch a rheostat R'. The plungers of both rheostats are carried by opposite arms of the lever S. With the minimum current the rheostat R has the maximum resistance and R' the minimum resistance, and as the current increases the resistance of R decreases and that of R' increases until with a maximum current the current is divided between the two branches in any proportion determined upon—say, for example, one-third through one and two-thirds through the other.

The novel essential principle of my invention may be variously otherwise applied in connection with different types or classes of meters and for the correction of various errors of registration to which said meters are liable.

Throughout this specification and claims I have used the word "meter" to denote current-measuring devices, the operation of which results from means controlled by the current which passes through the meter. In this sense I regard the parts which are introduced by my present invention as being additions to the meter proper and not as forming part thereof.

I am well aware that electric meters have been provided with shunts for diverting a portion of the total current around the meter proper; but in such cases the portion so diverted has been a constant one, no means being provided for varying the resistance of the shunt or the relative conductivities of the shunt-circuit and meter-circuit.

I am also aware that in the distribution of electricity by an alternating current it has been proposed to cause the meter to relatively overregister with a small current and underregister with a large one in order to automatically discount or give an advantage to a consumer when he is using a large number of lamps and charge a higher rate when using but few lamps. To accomplish this it was proposed to use a shunt around the meter of invariable resistance, but including an induction-coil or converter, in which a certain counter electro-motive force is inductively established, which suffices with a small current to divert nearly the entire current through the meter, while with a large current the proportion diverted through the meter is relatively reduced, the proportions of current passing through and around the meter being thus varied independently of the action of the meter itself. My invention has a different object—namely, to correct the normal tendency of the meter to over or under register with different volumes of current, which it accomplishes by varying the relative resistances in the branch circuit, including the meter and the short-circuiting branch around the meter, in order thereby to vary the division of current between said branch and the meter in such ratio as to correct the over or under register of the meter and cause it to register in correct proportion to the energy consumed. In the preferred form of my invention this determination of the relative resistances of the two branches is effected by the active element of the meter itself.

I claim as my invention the following-defined novel features, improvements, and combinations, substantially as hereinbefore specified, namely:

1. The combination, with an electric meter as a means for correcting the registry thereof, of a shunt around the meter and automatic means in the nature of a rheostat controlled by the current being measured for diverting through said shunt varying proportions of current from time to time as the total current varies, such rheostat being so proportioned that the current so diverted shall be graduated for each quantum of current proportionally to the normal overregistry for such quantum, whereby the registry is reduced to direct ratio to the current.

2. The combination, with an electric meter of the class operating by the repeated expansion and contraction of two thermal bodies heated alternately by the passage of the current being measured through alternate resistances, of a shunt short-circuiting said resistances, and means for diverting through the shunt a continually-increasing proportion of the total current as the mean temperature of the thermal bodies increases.

3. The combination, with an electric meter, of a shunt short-circuiting it, a variable rheostat in said shunt, and automatic means governed by the current being measured for operating said rheostat to vary its resistance in an inverse ratio to the variations in volume of the current being measured.

4. The combination, with an electric meter of the class operating by the expansion of a thermal body by the heat generated by the current being measured, of a shunt short-circuiting said meter, a variable rheostat in said shunt, and automatic means under the control of the current being measured for operating said rheostat to vary its resistance in an inverse ratio to the variations in volume of the current being measured.

5. The combination, with an electric meter of the class operating by the repeated expansion and contraction of a thermal body heated intermittently by the current being measured, of a shunt short-circuiting said meter, a variable rheostat in said shunt, and automatic means under the control of the current being measured for operating said rheostat to vary its resistance in an inverse ratio to the variations in volume of the current being measured.

6. The combination, with an electric meter of the class operating by the repeated expansion and contraction of two thermal bodies heated alternately by the current being measured, of a shunt short-circuiting said meter, a variable rheostat in said shunt, and automatic means under the control of the current being measured for operating said rheostat to vary its resistance in an inverse ratio to the variations in volume of the current being measured.

7. The combination, with an electric meter of the class operating by the repeated expansion and contraction of two thermal bodies heated alternately by the passage of the current being measured through alternate resistances, of a shunt short-circuiting said resistances, a variable rheostat in said shunt, and automatic means under the control of the current being measured for operating said rheostat to vary its resistance in an inverse ratio to the variations in volume of the current being measured.

8. The combination, with an electric meter of the class operating by the repeated expansion and contraction of two thermal bodies heated alternately by the passage of the current being measured through alternate resistances, of a shunt short-circuiting said resistances, a variable rheostat in said shunt, and automatic means under the control of the current being measured for operating said rheostat to vary its resistance in an inverse ratio to the variations in the mean temperature of the thermal bodies.

9. An electric meter comprising two thermal bodies, each arranged to be expanded by the heat generated by an electric current in traversing a resistance, a circuit divided into two branches, each including such a resistance, and a switch for alternating the current through said branches operated by the differential expansion and contraction of said bodies, whereby they are expanded alternately, combined with a shunt short-circuiting said resistances, and automatic means under the control of the current being measured operated by said thermal bodies for varying the conductivity of the shunt in proportion to variations in the mean temperature of the thermal bodies.

10. An electric meter comprising two heated thermal bodies, each arranged to be expanded longitudinally by the heat generated by an electric current in traversing a resistance, a circuit divided into two branches, each including such a resistance, and a switch for alternating the current through said branches operated by the differential expansion and contraction of said bodies, whereby they are expanded alternately, combined with a shunt short-circuiting said resistances, a rheostat in said shunt, and means for operating the rheostat controlled by variations in the mean elongation of the thermal bodies.

11. An electric meter comprising two elongated thermal bodies, each arranged to be expanded by the heat generated by an electric current in traversing a resistance, a circuit provided with two branches, each including such a resistance, a lever to which said thermal bodies are independently connected, whereby the lever is vibrated by their differential expansions and contractions, a switch for alternating the current through said branches operated by the vibrations of said lever, and a tension device arranged to exert a stretching tension through said lever on said thermal bodies, combined with a shunt short-circuiting said resistances, a rheostat in said shunt, and a connection between said rheostat and the fulcrum of said lever, whereby the mean elongations and contractions of the thermal bodies are transmitted to the rheostat to vary the resistance in said shunt.

12. An electric meter comprising two elongated thermal bodies, each arranged to be expanded by the heat generated by an electric current in traversing a resistance, a circuit divided into two branches, each including such a resistance, a switch for alternating the current through said branches, a lever for operating said switch, having opposite short arms to which the free ends of said thermal bodies are connected, whereby the lever is oscillated by their differential elongations and contractions, and a lever connected to the fulcrum of said lever, so as to be vibrated by the mean elongations and contractions of said thermal bodies, combined with a shunt around the meter and a rheostat in said shunt operated by the vibrations of said last-named lever to vary the resistance of the shunt.

13. The combination, with an electric meter and a shunt short-circuiting it, of a rheostat in said shunt, consisting of a bath of resistant liquid and a plunger relatively movable to immerse the plunger more or less in the liquid, and an electro-motive device for effecting such relative movements in consequence of changes in the current.

14. The combination, with an electric meter and a shunt short-circuiting it, of a rheostat in said shunt, consisting of a bath of mercury and a carbon plunger relatively movable to immerse the plunger more or less in the mercury, and an electro-motive device for effecting such relative movements in consequence of changes in the current.

15. In an electric meter, a switch for alternating the current between two branches, consisting of a vibrating switch-lever $e$ in connection with the undivided circuit having contact-fingers, terminal contacts for the respective branches with which said fingers make contact alternately, and a lever $d$, constructed in being thrown over from one extreme position to the other to encounter the lever $e$ and vibrate it to open one branch and close the other, and actuating means for vibrating the lever $d$, whereby the switch is thrown quickly, although the actuating movement may be slow.

16. In an electric meter, a switch for alternating the current between two branches, consisting of mercury-cups $g\ g'$, switch-lever $e$, having fingers $f\ f'$, for dipping alternately in the cups, a gravitating lever $d$, having a weight $w'$ and formed with opposite arms adapted on being thrown over to encounter the lever $e$ after passing the center and carry it with it during its falling movement, and actuating means for vibrating the lever $d$.

17. In an electric meter, a switch for alternating the current between two branches, consisting of mercury-cups $g\ g'$, switch-lever $e$, having fingers $f\ f'$ for dipping alternately in the cups, and ears $e'$, a lever $d$, having ears $d'$, embracing the ears $e'$, a standard $i$, having a pintle $i'$, passing through pivotal holes in said ears, and an actuating-arm $c$, engaging the lever $d$.

18. In an electric meter, a switch for alternating the current between two branches, comprising a vibrating switch-lever $e$, mercury-cups $g\ g'$, and vertically-adjustable supports for said cups.

19. In an electric meter, a switch for alternating the current between two branches, consisting of mercury-cups $g\ g'$ in connection with the branches, a vibrating switch-lever $e$ in connection with the undivided circuit, and means for insuring said latter connection, consisting of a mercury-cup and a conductor dipping into it, the one stationary and electrically connected to the undivided circuit and the other movable and carried by and electrically connected to said switch-lever.

20. In an electric meter comprising a thermal strip or wire fixed at one end and connected to a movable device at the other and a switch operated by said movable device for directing the current through said strip or wire intermittently, the combination therewith of a movable part to which the fixed end of the strip or wire is fastened and an adjusting-screw for moving said part in order to adjust the tension of the strip or wire.

21. In an electric meter comprising two thermal strips or wires, each fixed at one end and both connected to a movable device at the other, and a switch operated by said movable device for directing the current through said strips or wires alternately, the combination therewith of means for attaching the fixed end of each strip or wire and for adjusting its length and tension, consisting of a fixed standard, a movable part mounted to oscillate on said standard and to which the fixed end of the strip or wire is fastened, and an adjusting-screw for oscillating said part in order to adjust the tension of the strip or wire.

22. The combination, with an electric meter comprising a thermal body expanded more or less as the current varies and a lever vibrated thereby, of a rheostat, a lever operating it, and an adjustable connection between said levers, whereby the operation of the rheostat may be varied.

23. The combination, with an electric meter comprising a thermal body expanded more or less as the current varies and a lever K, vibrated thereby, of a rheostat R, a lever H, and an adjustable link connecting said levers, whereby the resistance of the rheostat for different elongations of the thermal body may be varied at will.

24. The combination, with an electric meter comprising a thermal body expanded more or less as the current varies and a lever K, vibrated thereby, of a rheostat R, a lever H, a link connecting said levers, and pivotal connections for said link adjustable along the levers to vary the ratio of movement transmitted through them to the rheostat.

In witness whereof I have hereunto signed my name in the presence of two subscribing witnesses.

JAMES J. WOOD.

Witnesses:
 ARTHUR C. FRASER,
 GEORGE W. FRASER.